(12) United States Patent
Sinn et al.

(10) Patent No.: US 8,462,762 B2
(45) Date of Patent: Jun. 11, 2013

(54) RADIO COMMUNICATION SYSTEM, COORDINATOR UNIT AND COMMUNICATIONS TERMINAL

(75) Inventors: Ulrich Sinn, Erlangen (DE); Christoph Weiler, Bretten (DE)

(73) Assignee: Siemens Aktiengesellschaft, Munich (DE)

( * ) Notice: Subject to any disclaimer, the term of this patent is extended or adjusted under 35 U.S.C. 154(b) by 205 days.

(21) Appl. No.: 12/739,361

(22) PCT Filed: Oct. 22, 2008

(86) PCT No.: PCT/EP2008/064313
§ 371 (c)(1),
(2), (4) Date: Apr. 22, 2010

(87) PCT Pub. No.: WO2009/053403
PCT Pub. Date: Apr. 30, 2009

(65) Prior Publication Data
US 2010/0309902 A1 Dec. 9, 2010

(30) Foreign Application Priority Data
Oct. 23, 2007 (DE) .................... 10 2007 051 605

(51) Int. Cl.
*H04B 7/212* (2006.01)
*H04J 3/06* (2006.01)
*H04W 72/00* (2009.01)

(52) U.S. Cl.
USPC ........... 370/347; 370/350; 370/461; 370/509; 455/451; 455/452.1

(58) Field of Classification Search
USPC ................. 370/311, 314, 336, 345–350, 376, 370/432, 461, 462, 458, 509; 455/436, 451, 455/452
See application file for complete search history.

(56) References Cited

U.S. PATENT DOCUMENTS 7,133,396 B1 * 11/2006 Schmidl et al. ............... 370/347
7,613,071 B2 * 11/2009 Iseli et al. ........................ 367/77
(Continued)

FOREIGN PATENT DOCUMENTS

CN 101043496 A 9/2007
DE 10 116 286 10/2002
(Continued)

OTHER PUBLICATIONS

Masatoshi, Sekine et al., "An Energy-Efficient MAC Protocol with Lightweight and Adaptive Scheduling for Wireless Sensor networks", Radio and Wireless Symposium, IEEE, pp. 161-164, 2007.

*Primary Examiner* — Michael Thier
*Assistant Examiner* — Awet Haile
(74) *Attorney, Agent, or Firm* — Cozen O'Connor

(57) ABSTRACT

A radio communication system including a coordinator unit and at least one communications terminal configured for the radio communication system in which access to the radio resource is performed in accordance with time-division multiplexing, where the radio resource is divided into determinate time frames, the coordinator unit assigns to the at least one communications terminal, at least one useful data transmission time slot whose temporal position is determined in sequential time frames with respect to the beginning of the particular time frame, and the individual time frames are structured such that they contain a synchronization time slot, at least one useful data transmission time slot of equal length and one additional dynamic time slot.

11 Claims, 5 Drawing Sheets

U.S. PATENT DOCUMENTS

| | | |
|---|---|---|
| 2002/0167920 A1 | 11/2002 | Miyazaki et al. |
| 2004/0109434 A1 | 6/2004 | Hwang |
| 2008/0188222 A1* | 8/2008 | Oh ................................ 455/436 |
| 2008/0212557 A1* | 9/2008 | Chiricescu et al. ........... 370/345 |
| 2008/0212582 A1* | 9/2008 | Zwart et al. .................... 370/390 |
| 2008/0291855 A1* | 11/2008 | Bata et al. ...................... 370/311 |
| 2011/0142096 A1* | 6/2011 | Gerhardt et al. ............... 375/133 |

FOREIGN PATENT DOCUMENTS

| | | |
|---|---|---|
| EP | 0 948 149 | 10/1999 |
| EP | 1 182 826 | 2/2002 |
| WO | WO 2005/099156 | 10/2005 |

* cited by examiner

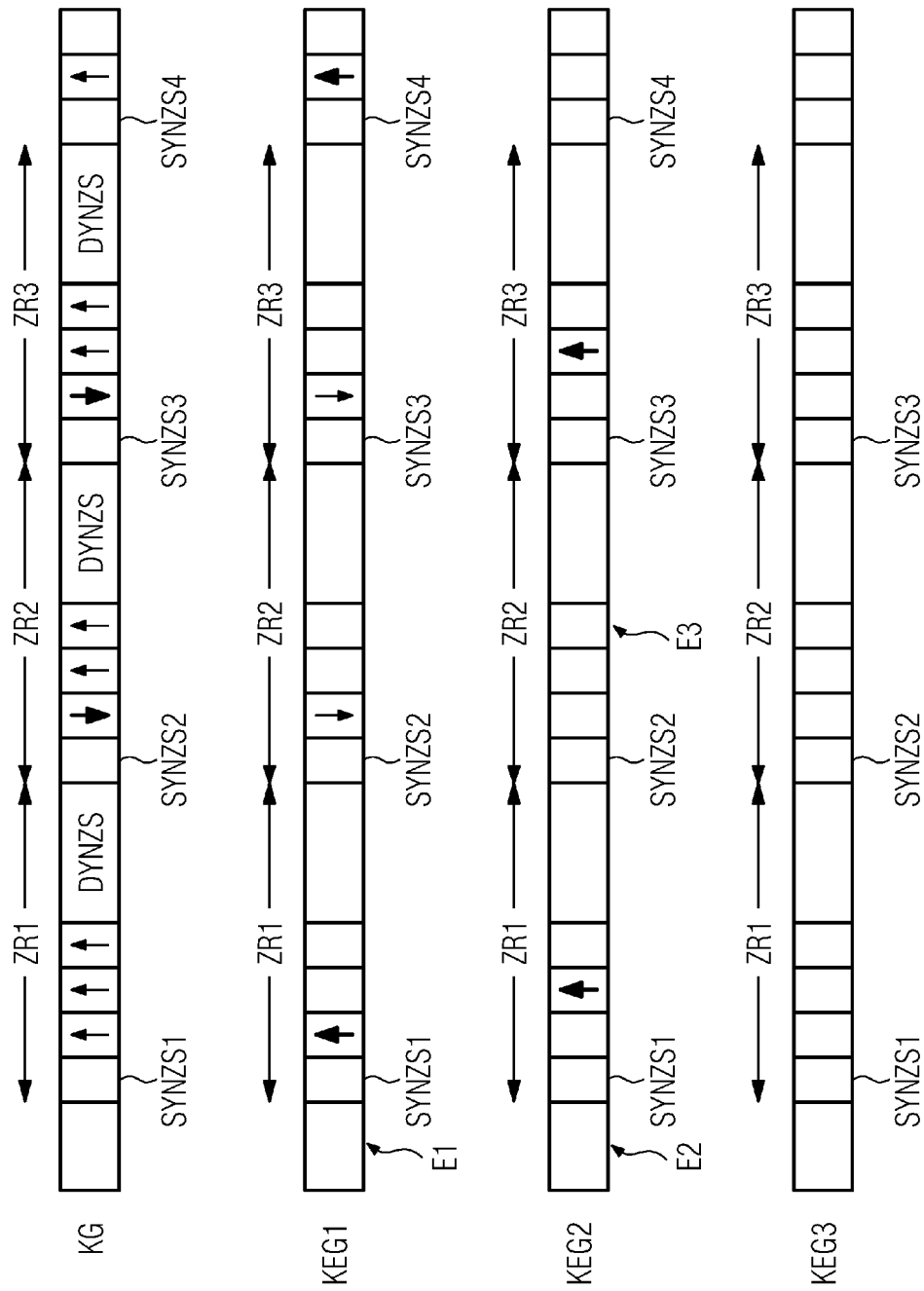

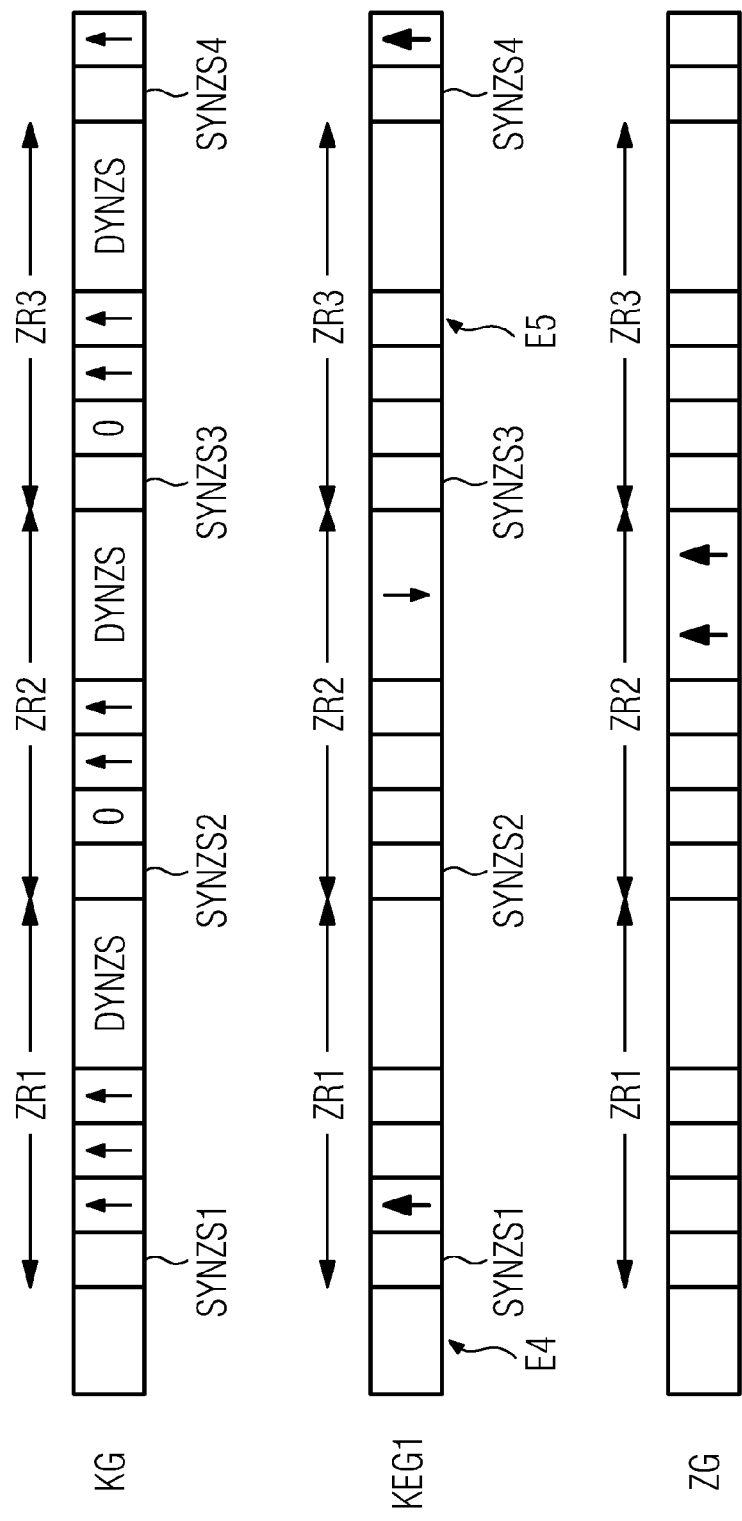

RADIO COMMUNICATION SYSTEM, COORDINATOR UNIT AND COMMUNICATIONS TERMINAL

CROSS-REFERENCE TO RELATED APPLICATION

This is a U.S. national stage of International Application No. PCT/EP2008/064313, filed on 22 Oct. 2008. Priority is claimed on German Application No. 10 2007 051 605.5, filed 23 Oct. 2007.

BACKGROUND OF THE INVENTION

1. Field of the Invention

The invention relates to radio communications and, more particularly, to a radio communication system, a coordinator unit and communications terminal.

2. Detailed Description of the Related Art

A large number of methods relating to when and how communications terminals obtain access to a data transmission medium are known to the person skilled in the art from communications technology, network technology and automation technology. In many cases, access to communication terminals, i.e., 'slaves', is allocated by a coordinator unit, i.e., a 'master'. As the sole network user, the coordinator unit has the right to access the data transmission medium unasked. However, the communications terminals must wait for the allocation from the coordinator unit before they are allowed to access the data transmission medium. The solution known as the 'master/slave method' is also used in many bus systems in automation technology.

Wireless networks, i.e., Wireless Sensor Actor Networks, have recently been established in addition to "wired" bus systems for data communication between the coordinator unit and the communications terminals in automation technology. Access by the individual communication terminals to the radio resource, is again allocated by the coordinator unit. An important method with respect to access to the radio resource is time-division multiplexing in which the time is divided into individual time frames of uniform length, which are in turn divided into determinate time slots of equal length. Access to the radio resource is possible for a communications terminal only within the allocated time slot or slots within a time frame. The temporal position of the individual time slots in successive time frames is determined in relation to the start of the respective time frame.

The allocation of a time slot, which recurs in successive time frames, by a coordinator unit to a communications terminal allows deterministic transmission of data. Deterministic transmission should be taken to mean that the data are transported within a time known and determined in advance from a data source (the sender) to the destination, i.e. the data sink (the receiver).

Furthermore, the data should be transmitted within a low latency=delay time. This should, moreover, be the time within which, following the occurrence of an event which is registered by a communications terminal, this event is communicated to the coordinator unit. In the described time-division multiplexing with time frames and a time slot that is fixed for a communications terminal, the latency is substantially determined by the length of the fixed time slot and the length of the time frame. Conventional technical requirements demand latencies of a few milliseconds.

SUMMARY OF THE INVENTION

It is an object of the present invention to provide a radio communication system which allows access to the radio resource to be optimally controlled with a low latency and deterministic transmission.

This and other objects and advantages are achieved in accordance with the invention by a radio communication system comprising a coordinator unit and at least one communications terminal in which access to the radio resource is structured according to time-division multiplexing, a) the radio resource being divided into determinate time frames, b) the coordinator unit allocating to the at least one communications terminal at least one useful data transmission time slot whose temporal position is determined in sequential time frames with respect to the beginning of the particular time frame, c) wherein the individual time frames are structured such that they contain a synchronization time slot, at least one useful data transmission time slots of equal length and one additional dynamic time slot.

The object is also achieved in accordance with the invention by a coordinator unit designed for a radio communication system.

The object is also achieved in accordance with the invention by a communications terminal designed for a radio communication system.

In accordance with the invention, the radio communication system, the coordinator unit and the communications terminal allow access to the radio resources to be optimally controlled with a low latency and deterministic transmission of the data.

In an embodiment, the radio communication system is advantageously configured such that by means of a synchronization message transmitted in a synchronization time slot, the coordinator unit communicates with the at least one communications terminal in a useful data transmission operating mode in which direction radio communication occurs between the coordinator unit and the at least one communications terminal within this time frame. As a result, the coordinator unit can receive useful data from the at least one communications terminal, or the at least one communications terminal is prepared for direct parameterization by the coordinator unit.

In another embodiment, the radio communication system is advantageously configured in accordance with the above embodiments of the invention such that the synchronization message defines the downward direction from the coordinator unit to the at least one communications terminal as the direction of communication, and the at least one communications terminal and the coordinator unit then switch into a coordinator parameterization operating mode in which the at least one communications terminal is parameterized. Of the various possibilities for parameterization of the communications terminal, direct parameterization by the coordinator unit is performed in this case.

In another embodiment, the radio communication system is advantageously configured such that by means of the synchronization message transmitted in the synchronization time slot, the coordinator unit communicates to the at least one communications terminal in the useful data transmission operating mode whether acknowledgement of received messages is necessary. As a result, communication security is increased and the latency reduced.

In yet another embodiment, the radio communication system is advantageously configured such that the dynamic time slot of a time frame is divided into a plurality of sub-time slots of equal length. As a result, a large number of additional units may communicate with the coordinator unit without disruption to data communication occurring between them.

In a further embodiment, the radio communication system is advantageously configured such that the dynamic time slot can be used by a communications terminal to which no useful data transmission time slot is allocated, and/or can be used by an accessory unit. Consequently, the dynamic time slot can be used for data communication with the coordinator unit in different ways. Here, it is used either by additional communications terminals for useful data transmission to the coordinator unit, or by an accessory unit with which additional communications terminals are parameterized by the accessory unit.

The radio communication system of the contemplated embodiment is advantageously configured such that by means of an accessory unit parameterization message the accessory unit indicates to the coordinator unit that it wants to parameterize the at least one communications terminal in an ad hoc parameterization operating mode, and by means of the synchronization message the coordinator unit then forces the at least one communications terminal to switch into the ad hoc parameterization operating mode. Parameterization of the communications terminals is thus performed by the accessory unit, radio channels being used which do not disrupt data communication between the coordinator unit and the communications terminals that are not parameterized by the accessory unit.

The radio communication system of the contemplated embodiment is advantageously configured such that, by means of an accessory unit parameterization message, the accessory unit indicates to the at least one communications terminal that it should leave the ad hoc parameterization operating mode, whereby the at least one communications terminal is forced to again synchronize with the synchronization message to communicate with the coordinator unit. As a result, the communications terminal parameterized re-participate by the accessory unit can quickly in data communication with the coordinator unit.

In a further embodiment, the radio communication system is advantageously configured such that the at least one communications terminal dwells in the power-saving sleep mode in the useful data transmission operating mode and only synchronizes with the synchronization message after the occurrence of an event, and sends a message to the coordinator unit in the allocated useful data transmission time slot in the time frame of this synchronization message. As a result, power-saving operation of the radio communication system is made possible with low latency and deterministic transmission.

In a still further embodiment, the radio communication system is advantageously configured such that, in the useful data transmission operating mode, the at least one communications terminal sends a status message to the coordinator unit in an allocated useful data transmission time slot in a predetermined time frame. As a result, the coordinator unit can quickly detect failure of a communications terminal and additional measures can be taken to restore data communication between this communications terminal and the coordinator unit.

In a still further embodiment, the radio communication system is advantageously configured to parameterize one or more of the following variables:
duration of the synchronization time slots,
number of useful data transmission time slots allocated to the at least one communications terminal within one time frame,
number of communications terminals, of which there is at least one,
duration of the useful data transmission time slots,
duration of the dynamic time slot and the number and duration of sub-time slots, and
encoding requirement of the messages to be transmitted.

As a result, transmission between a large number of communications terminals and a coordinator unit is achieved in various ways and is adapted to specific requirements.

Other objects and features of the present invention will become apparent from the following detailed description considered in conjunction with the accompanying drawings. It is to be understood, however, that the drawings are designed solely for purposed of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described therein.

BRIEF DESCRIPTION OF THE DRAWINGS

Further advantages of the invention emerge from the following description which, in conjunction with the accompanying drawings, describes the invention with reference to five exemplary embodiments, in which:

FIG. 3 shows data communication between a coordinator unit and three communications terminals in a useful data transmission operating mode and a coordinator parameterization operating mode;

FIG. 4 shows data communication between a coordinator unit, a communications terminal and an accessory unit in a useful data transmission operating mode and an ad hoc parameterization operating mode.

DETAILED DESCRIPTION OF THE PREFERRED EMBODIMENTS

Figure 1:
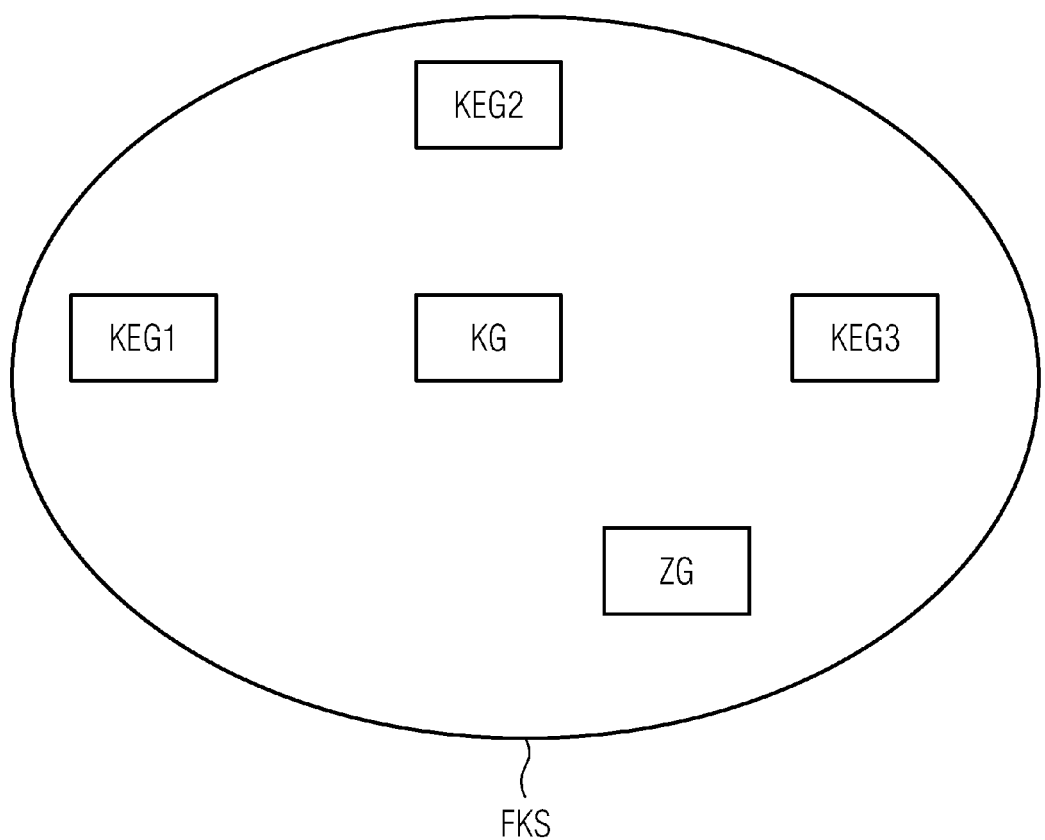
FIG. 1 is a schematic diagram showing a radio communication system comprising a coordinator unit, three communications terminals and an accessory unit.

FIG. 1 shows a radio communication system FKS comprising a coordinator unit KG, three communications terminals KEG1, KEG2, KEG3 and an accessory unit ZG. The coordinator unit also establishes data communication with respect to the higher-order network infrastructure. The radio communication system FKS is, for example, a wireless sensor/actor network. The communications terminals KEG1, KEG2, KEG3 can therefore be designed as sensors or actors. The person of ordinary skill will appreciate that a radio communication system FKS of this kind may also comprise additional communications terminals or accessory units (not shown for purposes of clarity).

Figure 2A:
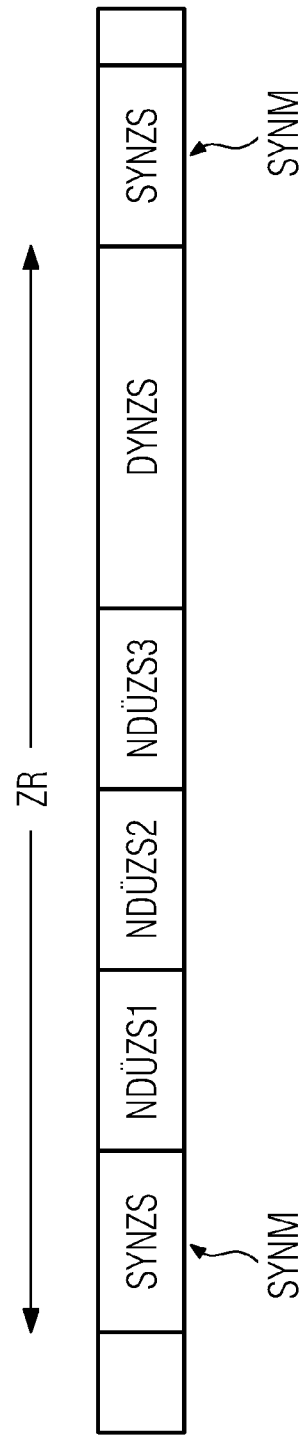
FIG. 2a shows structuring of a time frame comprising a synchronization time slot, three useful data transmission time slots and a dynamic time slot which is structured as a monolithic area.

FIG. 2a shows structuring of a time frame ZR comprising a dynamic time slot DYNZS, which is structured as a monolithic area. The time frame ZR begins with a synchronization time slot SYNZS, three successive useful data transmission time slots NDÜZS1, NDÜZS2, NDÜZS3 which the dynamic time slot DYNZS follows. The following time frame, of which only the synchronization time slot SYNZS is shown, follows the illustrated complete time frame ZR. In the illustrated complete time frame ZR, the synchronization message SYNM is transmitted in the synchronization time slot SYNZS by the coordinator unit KG to the communications terminals KEG1, KEG2, KEG3 which support data communication with the coordinator unit KG. These communications terminals KEG1, KEG2, KEG3 should synchronize with the synchronization message SYNM contained in the synchronization time slot SYNZS of the time frame ZR, but should at all events implement the message content thereof.

The useful data transmission time slot NDÜZS1 is allocated to communications terminal KEG1, useful data transmission slot NDÜZS2 is allocated to communications terminal KEG2 and useful data transmission slot NDÜZS3 is allocated to communications terminal KEG3. The duration of the synchronization time slot SYNZS, the number of useful data transmission time slots NDÜZS1, NDÜZS2, NDÜZS3 allocated to the communications terminals KEG1, KEG2, KEG3 within one time frame, the number of communications terminals KEG1, KEG2, KEG participating in data communication, the duration of the useful data transmission time slots NDÜZS1, NDÜZS2, NDÜZS3, the duration of the dynamic time slot DYNZS and the number and duration of the sub-time slots UZS1, UZS2 can be parameterized and is determined by software loaded onto the coordinator unit KG before the radio communication system FKS is put into service. The decision as to whether data communication from/to the communications terminals KEG1, KEG2, KEG3 should occur in encoded or unencoded form can also be parameterized by the coordinator unit KG.

Parameterization is largely determined by the configuration of the radio communication system FKS and influenced, for example, by the following variables: number of communications terminals KEG1, KEG2, KEG3 participating in data communication, the maximum latency that is to be maintained, size of the messages to be transmitted from to the communications terminals KEG1, KEG2, KEG3 or number of accessory units ZG.

The dynamic time slot DYNZS can be used by additional communications terminals to which no useful data transmission time slot NDÜZS1, NDÜZS2, NDÜZS3 has been allocated by the coordinator unit KG for cyclical data communication with the coordinator unit KG. Before a communications terminal uses the dynamic time slot DYNZS, the coordinator unit must synchronize with the synchronization message SYNM in the synchronization time slot SYNZS that preceded the dynamic time slot DYNZS. In particular, the dynamic time slot DYNZS can also be used if the data packets to be transmitted are too long to be transmitted within one useful data transmission time slot NDÜZS1, NDÜZS2, NDÜZS3.

The dynamic time slot DYNZS can also be used by an accessory unit ZG which is used to parameterize the communications terminals KEG1, KEG2, KEG3, as described in more detail subsequently.

Data collisions between different communications terminals or the accessory unit ZG in the dynamic time slot DYNZS are resolved by congestion-resolving mechanisms, i.e., backoff mechanisms, as known to a person skilled in the art in which a repeated sending of data packets takes place at subsequent, randomly selected times or data packets of certain communications terminals are prioritized.

Figure 2B:
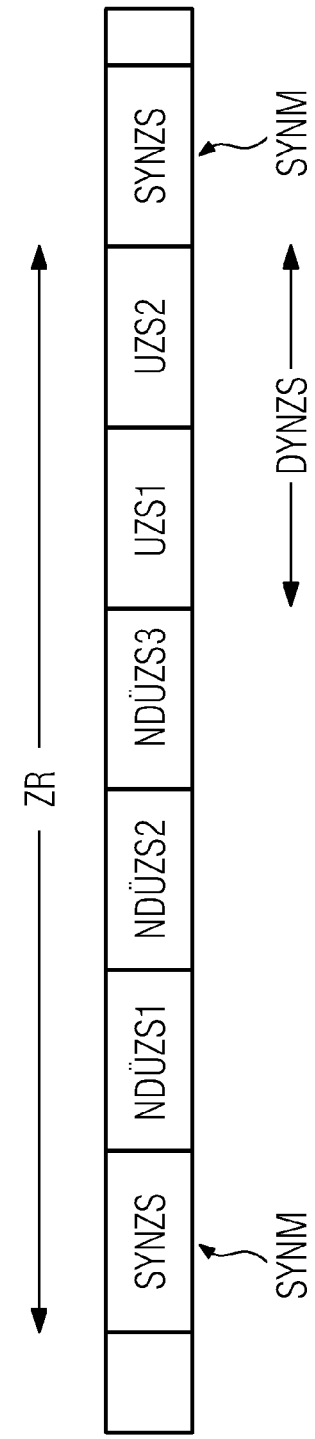
FIG. 2b shows FIG. 2a expanded such that the dynamic time slot is divided into two sub-time slots.

FIG. 2b differs from FIG. 2a only insofar as the dynamic time slot DYNZS in time frame ZR is divided into two sub-time slots UZS1, UZS2. As a result, two additional communications terminals or accessory units can perform a data communication with the coordinator unit KG without a disruption in data communication occurring between them.

FIG. 3 shows data communication between a coordinator unit KG and three communications terminals KEG1, KEG2, KEG3 in a useful data transmission operating mode and a coordinator parameterization operating mode in three successive time frames ZR1, ZR2, ZR3 and the beginning of a fourth time frame which follows the third time frame ZR3. The construction of the time frames ZR1, ZR2, ZR3 in each case matches that from FIG. 2a. Three useful data transmission time slots respectively, which to preserve clarity are not shown in FIG. 3, follow the synchronization time slots SYNZS, SYNZS1, SYNZS2, SYNZS3 and SYNZS4. The coordinator unit KG allocates the three useful data transmission time slots to the three communication terminals KEG1, KEG2, KEG3, as described in FIG. 2a.

Data communication between the coordinator unit KG and the first communication terminal KEG1 will firstly be described in more detail.

Before the first time frame ZR1, an event E1 occurs that is registered by the first communications terminal KEG1. This event E1 could, for example, be the exceeding of a temperature threshold, the detection of a fire, etc., in any case something which is detected, for example, by a communications terminal KEG1 designed as a sensor and which must be communicated to the coordinator unit KG as a result of fixed processing guidelines in the sensor.

Thus, a message can be communicated to the coordinator unit KG that the first communications terminal KEG1 must synchronize with the next synchronize message in the synchronization time slot SYNZS1. For this purpose, the first communications terminal KEG1, by evaluating the synchronization message, establishes that it is in a useful data transmission operating mode, i.e., can send data to the coordinator unit KG in the useful data transmission slot, following the synchronization time slot, allocated by the coordinator unit KG. This is shown in FIG. 3 and later also in FIG. 4 by a thick arrow being shown in the useful data transmission time slot NDÜZS1. Thick arrows in the useful data transmission time slots NDÜZS1, NDÜZS2, NDÜZS3 represent sent messages, moreover. Thin arrows in the useful data transmission time slots NDÜZS1, NDÜZS2, NDÜZS3 of communications terminals KEG1, KEG2, KEG3 represent received messages, moreover. Thin arrows in the useful data transmission time slots NDÜZS1, NDÜZS2, NDÜZS3 of the coordinator unit KG represent received messages, moreover, if messages have been sent by communications terminals KEG1, KEG2, KEG3 in corresponding useful data transmission time slots NDÜZS1, NDÜZS2, NDÜZS3, or the readiness-to-receive of the coordinator unit KG if no messages have been sent by communications terminals KEG1, KEG2, KEG3 in corresponding useful data transmission time slots NDÜZS1, NDÜZS2, NDÜZS3. If there are no arrows in useful data transmission time slots NDÜZS1, NDÜZS2, NDÜZS3, then this is intended to show that no messages are being sent from communications terminals KEG1, KEG2, KEG3 to the coordinator unit KG in these useful data transmission time slots NDÜZS1, NDÜZS2, NDÜZS3.

In useful data transmission, time slot NDÜZS1 of time frame ZR1 communications terminal KEG1 therefore sends a message to the coordinator unit KG. Due to synchronization of the communications terminal KEG1 with the synchronization message in the second synchronization time slot SYNZS2 of time frame ZR2, communications terminal KEG1 receives the communication that it should switch from the useful data transmission operating mode into the coordinator parameterization operating mode in which communications terminal KEG1 receives a parameterization message from the coordinator unit KG in the useful data transmission time slot NDÜZS1 of the second time frame ZR2. Due to the amount of data, transmission of the parameterization message cannot be completed in a single useful data transmission time slot, however. If the communication terminal KEG1 now synchronizes with the synchronization message in the third synchronization time slot SYNZS3 of the third time frame ZR3, it receives the communication that the coordinator parameterization operating mode should be maintained. From the coordinator unit KG in the useful data transmission time slot NDÜZS1 of the third time frame ZR3, the communication terminal KEG1 now receives the second part of the parameterization message which could now be transmitted completely in the useful data transmission time slot NDÜZS1 of the third time frame ZR3.

Parameterization messages, which the communications terminal KEG1 receives in coordinator parameterization operating mode from the coordinator unit KG, are optionally acknowledged by the communications terminal KEG1 in a successively allocated useful data transmission time slot by an acknowledgement message BM. Here, it is possible to parameterize how many parameterization messages correctly received by the first communications terminal KEG1 are acknowledged with an acknowledgement message BM. As a result, it is possible to acknowledge each parameterization message separately, as well as blocks of parameterization messages, with an acknowledgement message BM. With a good data connection, acknowledgement messages (BM), which each acknowledge a block of parameterization messages, only minimally reduce data throughput.

If the communications terminal KEG1 now synchronizes with the synchronization message in the fourth synchronization time slot SYNZS4 of the fourth time frame, the communications terminal KEG1 receives the communication that it should switch from the coordinator parameterization operating mode back into the useful data transmission operating mode. The communications terminal KEG1 now sends messages (useful data) to the coordinator unit KG in the useful data transmission time slot NDÜZS1 of the fourth time frame.

Data communication between the coordinator unit KG and the second communications terminal KEG2 will now be described in more detail.

As a result of an event E2 before the first time frame ZR1 and following synchronization of the second communications terminal KEG2 with the synchronization message SYNM in the first synchronization time slot SYNZS1 of the first time frame ZR1, the second communications terminal KEG2 sends a message to the coordinator unit KG in the useful data transmission time slot NDÜZS2 of the time frame ZR1, which message could be transmitted completely in this useful data transmission time slot NDÜZS2 of the first time frame ZR1.

Consequently, the radio communication system FKS can be operated in a power-saving manner, and if no repeated event precedes the second synchronization time slot SYNZS2 of the second time frame ZR2, the second communications terminal KEG2 does not synchronize with the synchronization message SYNM of the second synchronization time slot SYNZS2 of the second time frame ZR2 but dwells in the power-saving sleep mode. However, if the message could not be completely transmitted to the coordinator unit KG in the useful data transmission time slot NDÜZS2, and this is not shown in FIG. 3, the second communications terminal KEG2 would synchronize with the synchronization message SYNM of the second synchronization time slot SYNZS2 of the second time frame ZR2 and transmit the part of the message, which has not yet been transmitted, to the coordinator unit KG in the second useful data transmission time slot NDÜZS2 of the second time frame.

Following the second synchronization time slot SYNZS2 of the second time frame ZR2 an event E3 in turn occurs, however, which is registered by the second communications terminal KEG2 and has to be indicated to the coordinator unit KG. To achieve this indication, the second communications terminal KEG2 synchronizes with the synchronization message SYNM of the third synchronization time slot SYNZS3 in the third time frame ZR3, and in the second useful data transmission time slot NDÜZS2 of the third time frame ZR3 transmits a message (useful data) to the coordinator unit KG, which message, in turn, could be transmitted completely in the second useful data transmission time slot NDÜZS2 of the third time frame ZR3.

The second communications terminal KEG2, in turn, then dwells in the power-saving sleep mode, as described previously with respect to the second time frame ZR2, until an event re-occurs.

Data communication does not occur between the coordinator unit KG and the third communications terminal KEG3. The third communications terminal KEG3 dwells in the power-saving sleep mode.

FIG. 4 shows data communication between a coordinator unit KG, a first communications terminal KEG1 and an accessory unit ZG in a useful data transmission operating mode and an ad hoc parameterization operating mode. Structure and presentation match those in FIG. 3 unless modifications are specified.

As a result of an event E4 before the first time frame ZR1 and following synchronization of the first communications terminal KEG1 with the synchronization message SYNM in the first synchronization time slot SYNZS1 of the first time frame ZR1, the first communications terminal KEG1 sends a message to the coordinator unit KG in the useful data transmission time slot NDÜZS1 of the time frame ZR1, which message could be transmitted completely in this useful data transmission time slot NDÜZS1 of the first time frame ZR1.

No new event precedes the second synchronization time slot SYNZS2 of the second time frame ZR2. The first communications terminal KEG1 does not synchronize with the synchronization message SYNM of the second synchronization time slot SYNZS2 of the second time frame ZR2 therefore but dwells in the power-saving sleep mode.

In the dynamic time slot DYNZS of the first time frame ZR1, however, the accessory unit ZG, to which no useful data transmission time slot is allocated, indicates to the coordinator unit KG by an accessory unit parameterization message that it wants to parameterize the first communications terminal KEG1 in an ad hoc parameterization operating mode. The coordinator unit KG then forces the first communications terminal KEG1 to switch to the ad hoc parameterization operating mode by means of the synchronization message SYNM in the second synchronization time slot SYNZS2 of the second time frame ZR2. The first useful data transmission time slot NDÜZS1 of the second time frame ZR2 in the coordinator unit KG is not used for receiving messages therefore, which is represented by 0 in FIG. 4.

In the second dynamic time slot DYNZS of the second time frame ZR2, the accessory unit ZG then sends a parameterization message to the first communications terminal KEG1 over a radio channel which does not disrupt data communication between the coordinator unit KG and the communications terminals not parameterized by the accessory unit ZG.

In the second dynamic time slot DYNZS of the second time frame ZR2, the first communications terminal KEG1 then sends a response message to the accessory unit ZG. The accessory unit ZG indicates to the first communications terminal KEG1 by an accessory unit parameterization termination message that the first communications terminal KEG1 should leave the ad hoc parameterization operating mode again. The first useful data transmission time slot NDÜZS1 of the third time frame ZR3 is not used in the coordinator unit KG for receiving messages, however.

As a result of an event E5 before the fourth synchronization time slot SYNZS4, the first communications terminal KEG1 again synchronizes with the synchronization message SYNM in the fourth synchronization time slot SYNZS4 and the first communications terminal KEG1 sends a message to the coordinator unit KG in the useful data transmission time slot NDÜZS1 of the fourth time frame ZR4 (not shown in full or denoted in FIG. 4).

Naturally (and this is not shown in FIG. 4), as a result of synchronization with the synchronization time slot SYNZS3, the communications terminal KEG1 could also send a message to the coordinator unit KG as early as in the useful data transmission time slot NDÜZS1 of the third time frame ZR3. Parameterization of the first communications terminal KEG1 by the accessory unit ZG can also extend over a plurality of dynamic time slots DYNZS and the response of the first communications terminal KEG1 to parameterization of the accessory unit ZG does not necessarily have to be made in the same dynamic time slot DYNZS.

In FIGS. 3 and 4, the communications terminals KEG1, KEG2 send messages (useful data) as a result of events E1, E2, E3, E4, E5 that have occurred. If no events occur over a relatively long period, however, the communications terminals dwell in the power-saving sleep mode.

For a relatively long period, the coordinator unit KG then does not know whether a communications terminal is still operating correctly or has already failed. It would therefore not be possible for parameterization or diagnostics to reach a communications terminal that has failed. The radio communication system FKS can therefore also be parameterized such that, irrespective of the occurrence of an event, the communications terminals have to send a status message to the coordinator unit KG at predetermined intervals and in allocated useful data transmission slots. The absence of a status message indicates the failure of the communications terminal. The status message may also contain diagnostics information.

Figure 5:
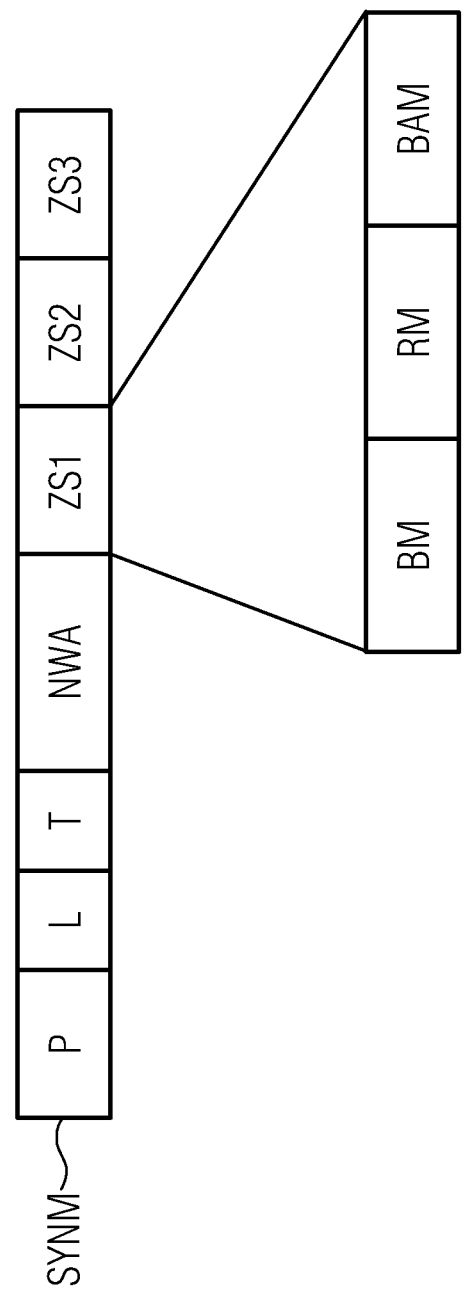
FIG. 5 shows structuring of a synchronization message transmitted in a synchronization time slot.

FIG. 5 shows structuring of a synchronization message SYNM transmitted in a synchronization time slot. The synchronization message SYNM consists of a first section comprising a preamble bit pattern P for time synchronization, specifications relating to the frame length L, specifications relating to the frame type T and a network address NWA (a network address with a length of 8 bits means 256 networks may be distinguished, and this is sufficient in the practice of factory buildings or industrial plant) and a second section for controlling the time slots ZS1, ZS2, ZS3 allocated to the three communications terminals KEG1, KEG2, KEG3. The control message (second section) relating to time slot ZS1 is described by way of example and comprises a first part BM, with which the coordinator unit KG indicates to the first communications terminal KEG1 whether a preceding message, or a plurality thereof, sent by the first communications terminal KEG1 has been correctly received by the coordinator unit KG or not and/or whether an acknowledgement is required from the first communications terminal KEG, a second part RM which fixes the direction of data communication between coordinator unit KG and first communications terminal KEG1 within this time frame, and a third part BAM which indicates to the first communications terminal KEG1 in what operating mode the first communications terminal KEG1 is being operated in this time frame.

In the simplest case, one bit is provided for each part BM, RM, BAM of the control message, i.e., 3 bits in total. The bit value 0 of the first part BM indicates to the first communications terminal KEG 1 that a preceding message, or a plurality thereof, sent by the first communications terminal KEG1 has been correctly received by the coordinator unit KG. The bit value 0 of the second part requests a transmit mode by the first communications terminal KEG1 and a receive mode by the coordinator unit KG, and the bit value 0 of the third part requests operation of the first communications terminal KEG in the useful data transmission operating mode or coordinator parameterization operating mode. Conversely, the bit value 1 of the first part BM of the first communications terminal KEG1 indicates that no preceding message, or a plurality thereof, sent by the first communications terminal KEG1 has been correctly received by the coordinator unit KG. The bit value 1 of the second part requests a receive mode by the first communications terminal KEG1 and a transmit mode by the coordinator unit KG, and the bit value 1 of the third part requests switching of the first communications terminal KEG1 into an ad hoc parameterization operating mode.

It should be determined in advance in the coordinator parameterization operating mode whether the coordinator unit KG has to acknowledge correct receipt of messages from the first communications terminal KEG1. To minimize the latency in the useful data transmission operating mode, each message sent by the first communications terminal KEG1 in the preceding useful data transmission time slot and correctly received by the coordinator unit KG is acknowledged by the coordinator unit KG in the synchronization message SYNM in the subsequent synchronization time slot. If this message has not been correctly received by the coordinator unit KG, however, there is no acknowledgement message BM from coordinator unit KG.

If the coordinator unit KG does not send an acknowledgement message BM in this case, the first communications terminal KEG1 must re-send the last-sent message to the coordinator unit KG in the following useful data transmission time slot.

As described previously, individual messages can be encoded in the radio communication system FKS by instructions to the communications terminals KEG1, KEG2, KEG3 in the synchronization messages. Alternatively, all messages may be encoded. Each radio communication system FKS receives its own code. As a result, it is not necessary for a separate network address to be used. If a message can be decoded, the message originates from a communications terminal KEG1, KEG2, KEG3 in the radio communication system FKS.

In accordance with the disclosed embodiments, the radio communication system FKS has the following advantages
1. Separate operating modes a) for transmitting messages (process values) in the useful data transmission operating mode, b) for parameterizing communications terminals by the coordinator unit in the coordinator parameterization operating mode, c) for parameterizing communications terminals by the accessory unit in the ad hoc parameterization mode, whereby the following advantages are achieved:
d) low latency for the transmission of process values
e) parameterization of communications terminal in the coordinator parameterization operating mode and the ad hoc parameterization operating mode without adverse effects on the latency.

2. No parameterization of communications terminals by the accessory unit in the useful data transmission operating mode, whereby the following advantages are achieved:
a) parameterization by the accessory unit without adverse effects on the latency,
b) the entire bandwidth of a radio channel is available for parameterization by the accessory unit.
3. Information on the operating mode of the communications terminals in the synchronization message, whereby the following advantages are achieved:
a) the communications terminals can be put into different operating modes,
b) it is possible to switch between operating modes with minimal latency.
4. Inclusion of the requirement for the communications terminals to send an acknowledgement message in the synchronization message, whereby the following advantage is achieved:
length of the times slots, and therefore the latency, can be minimized.
5. Inclusion of direction information in the synchronization message, whereby the following advantages are achieved:
a) the coordinator unit can separately switch the direction of data communication to the communications terminals,
b) no separate radio channel, which would increase the latency, is required for the direction from coordinator unit to communications terminal.
6. The number and length of the time slot can be freely parameterized, such that the radio communication system can be advantageously optimized for minimal latency in the case of a few users (communications terminals) and for a large number of users with an increased latency.

The invention is not limited to the specific exemplary embodiments but includes further modifications that are not explicitly disclosed, provided use is made of the essence of the invention.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. Moreover, it should be recognized that structures shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A radio communication system, comprising:
a coordinator unit;
at least one communications terminal, in which access to a radio resource is structured in accordance with time-division multiplexing; and
an accessory unit;
wherein the radio resource is divided into determinate time frames and the coordinator unit allocates to the at least one communications terminal at least one useful data transmission time slot, a temporal position of each at least one useful data transmission time slot being determined in individual sequential time frames with respect to a beginning of a particular time frame;
wherein the individual sequential time frames are structured such that each time frame contains a synchronization time slot, the at least one useful data transmission time slot of equal length and an additional dynamic time slot;
the additional dynamic time slot being usable by at least one of a specific one of the at least one communications terminal to which the at least one useful data transmission time slot has not been allocated and the accessory unit, and the coordinator unit synchronizing with a synchronization message in the synchronization time slot that preceded the additional dynamic time slot before the at least one communications terminal uses the additional dynamic time slot; and
wherein the accessory unit is configured to indicate to the coordinator unit in an accessory unit parameterization message that said accessory unit wants to parameterize one of the at least one communications terminal in an ad hoc parameterization operating mode and the coordinator unit is configured to in the synchronization message force said one of the at least one communications terminal to switch into the ad hoc parameterization operating mode.

2. The radio communication systems as claimed in claim 1, wherein, by the synchronization message transmitted in the synchronization time slot, the coordinator unit communicates to the at least one communications terminal in a useful data transmission operating mode in which a radio communication direction occurs between the coordinator unit and the at least one communications terminal within the particular time frame.

3. The radio communication system as claimed in claim 2, wherein when the synchronization message defines a downward direction from the coordinator unit to the at least one communications terminal as the communication direction, the at least one communications terminal and the coordinator unit then switch into a coordinator parameterization operating mode in which the at least one communications terminal is parameterized.

4. The radio communication system as claimed in claim 2, wherein, by the synchronization message transmitted in the synchronization time slot, the coordinator unit communicates to the at least one communications terminal in the useful data transmission operating mode whether an acknowledgement of received messages is necessary.

5. The radio communication system as claimed in claim 2, wherein the at least one communications terminal dwells in the useful data transmission operating mode in a power-saving sleep mode and only synchronizes with the synchronization message after an occurrence of an event, and sends a message to the coordinator unit in the allocated at least one useful data transmission time slot in the particular time frame of the synchronization message after the occurrence.

6. The radio communication system as claimed in claim 2, wherein, in the useful data transmission operating mode, the at least one communications terminal sends a status message to the coordinator unit in an allocated one of the at least one useful data transmission time slot in the predetermined time frame.

7. The radio communication system as claimed in claim 1, wherein the dynamic time slot of the sequential individual time frame is divided into a plurality of sub-time slots of equal length.

8. The radio communication system as claimed in claim 1, wherein the accessory unit is configured to, by an accessory unit parameterization message, indicate to the at least one communications terminal that said at least one communications terminal should leave the ad hoc parameterization operating mode, and the at least one communications terminal is forced to resynchronize with the synchronization message to communicate with the coordinator unit in response to the parameterization message.

9. The radio communication system as claimed in claim 1, wherein at least one of the following variables is parameterizable: a duration of synchronization time slots, a number of useful data transmission time slots allocated to the at least one communications terminal within one time frame, a number of at least one communications terminals, a duration of useful data transmission time slots, a duration of the additional dynamic time slot, a number and duration of said plural sub-time slots and an encoding requirement of messages to be transmitted.

10. A coordinator unit configured for a radio communication system comprising at least one communications terminal and an accessory unit, in which access to a radio resource is structured in accordance with time-division multiplexing;
   wherein the radio resource is divided into determinate time frames and the coordinator unit allocates to the at least one communications terminal at least one useful data transmission time slot, a temporal position of each at least one useful data transmission time slot being determined in individual sequential time frames with respect to a beginning of a particular time frame;
   wherein the individual sequential time frames are structured such that each time frame contains a synchronization time slot, the at least one useful data transmission time slot of equal length and an additional dynamic time slot;
   the additional dynamic time slot being usable by at least one of a specific one of the at least one communications terminal to which the at least one useful data transmission time slot has not been allocated and the accessory unit, and the coordinator unit synchronizing with a synchronization message in the synchronization time slot that preceded the additional dynamic time slot before the at least one communications terminal uses the additional dynamic time slot; and
   wherein the coordinator unit is configured to receive an accessory unit parameterization message from the accessory unit indicating that said accessory unit wants to parameterize the at least one communications terminal in an ad hoc parameterization operating mode and the coordinator unit is configured to in the synchronization message force the at least one communications terminal to switch into the ad hoc parameterization operating mode.

11. A communications terminal configured for a radio communication system comprising the communications terminal, a coordinator unit, and an accessory unit in which access to a radio resource is structured in accordance with time-division multiplexing;
   wherein the radio resource is divided into determinate time frames and the coordinator unit allocates to the communications terminal at least one useful data transmission time slot, a temporal position of the at least one useful data transmission time slot being determined in individual sequential time frames with respect to a beginning of a particular time frame;
   wherein the individual sequential time frames are structured such that each time frame contains a synchronization time slot, the at least one useful data transmission time slot of equal length and an additional dynamic time slot;
   the additional dynamic time slot being usable by at least one of a further communications terminal to which the at least one useful data transmission time slot has not been allocated and the accessory unit, and the coordinator unit synchronizing with a synchronization message in the synchronization time slot that preceded the additional dynamic time slot before the at least one communications terminal uses the additional dynamic time slot; and
   wherein the communications terminal is configured to switch into an ad hoc parameterization operating mode in response to the synchronization message received from the coordinator unit.

* * * * *